(12) United States Patent
Fernandez et al.

(10) Patent No.: US 10,563,053 B2
(45) Date of Patent: Feb. 18, 2020

(54) PARTIALLY-CROSSLINKED POLYETHYLENE FORMULATIONS AND METHODS OF MAKING SAME

(71) Applicants: Dow Quimica Mexicana S.A. de C.V., Mexico City (MX); Dow Quimica De Colombia S.A., Bogota (CO)

(72) Inventors: Patricia Perdiz Fernandez, Mexico City (MX); Miguel A. Molano Niampira, Bogota (CO)

(73) Assignees: Dow Quimica De Colombia S.A., Bogota DC (CO); Dow Quimica Mexicana S.A. Dec.V., Mexico City (MX)

( * ) Notice: Subject to any disclaimer, the term of this patent is extended or adjusted under 35 U.S.C. 154(b) by 49 days.

(21) Appl. No.: 16/064,228

(22) PCT Filed: Dec. 20, 2016

(86) PCT No.: PCT/US2016/067706
§ 371 (c)(1),
(2) Date: Jun. 20, 2018

(87) PCT Pub. No.: WO2017/112642
PCT Pub. Date: Jun. 29, 2017

(65) Prior Publication Data
US 2019/0002673 A1 Jan. 3, 2019

Related U.S. Application Data

(60) Provisional application No. 62/270,251, filed on Dec. 21, 2015.

(51) Int. Cl.
| | |
|---|---|
| *C08L 23/06* | (2006.01) |
| *C08L 23/08* | (2006.01) |
| *C08J 3/24* | (2006.01) |
| *C08K 5/14* | (2006.01) |

(52) U.S. Cl.
CPC .......... *C08L 23/06* (2013.01); *C08L 23/0815* (2013.01); *C08L 2203/18* (2013.01); *C08L 2205/025* (2013.01); *C08L 2312/00* (2013.01)

(58) Field of Classification Search
CPC .. C08L 23/06; C08L 23/0815; C08L 23/0892; C08L 2203/18; C08L 2205/025; C08L 2312/00; C08K 5/14; C08J 3/244
See application file for complete search history.

(56) References Cited

U.S. PATENT DOCUMENTS

| 2,993,882 A | 7/1961 | Ashby et al. |
|---|---|---|
| 4,171,338 A | 10/1979 | Mason |
| 7,714,072 B2 | 5/2010 | Michie, Jr. et al. |
| 2006/0047076 A1 | 3/2006 | Scheie |
| 2007/0232716 A1* | 10/2007 | Guenther et al. ........ C08J 3/244 522/150 |
| 2008/0188632 A1 | 8/2008 | Razavi |
| 2012/0289668 A1 | 11/2012 | Razavi |
| 2012/0316298 A1 | 12/2012 | Razavi |
| 2014/0109980 A1 | 4/2014 | Karunakaran et al. |
| 2015/0025195 A1 | 1/2015 | Cottle et al. |
| 2017/0107365 A1* | 4/2017 | Rycroft et al. ...... C08L 23/0815 |

FOREIGN PATENT DOCUMENTS

| CA | 2547156 A1 | 11/2007 |
|---|---|---|
| WO | 0035646 A1 | 6/2000 |
| WO | 2005095838 A1 | 10/2005 |
| WO | 2012010476 A1 | 1/2012 |

OTHER PUBLICATIONS

International Search Report and Written Opinion pertaining to PCT/US2016/067706 dated Mar. 16, 2017.

* cited by examiner

Primary Examiner — Nathan M Nutter
(74) Attorney, Agent, or Firm — Dinsmore & Shohl LLP

(57) ABSTRACT

Embodiments of polyethylene formulations comprise a partially cross-linked multimodal polyethylene composition having a the first molecular weight ethylene-based polymer component and a second molecular weight ethylene-based polymer component, wherein the partially cross-linked multimodal polyethylene composition comprises a density from 0.930 g/cc to 0.943 g/cc measured according to ASTM D792, a melt index ($I_2$) from 0.01 g/10 min to 5 g/10 min, when measured according to ASTM D1238 at 190° C. and a 2.16 kg load, a molecular weight distribution (MWD) from 5 to 10, wherein MWD is defined as Mw/Mn with Mw being a weight average molecular weight and Mn being a number average molecular weight, and a complex viscosity ratio from 250 to 450, wherein the complex viscosity ratio is defined as the complex viscosity at a shear rate of 0.01 rad/s divided by the complex viscosity at a shear rate of at a shear rate of 100 rad/s.

15 Claims, 3 Drawing Sheets

PARTIALLY-CROSSLINKED POLYETHYLENE FORMULATIONS AND METHODS OF MAKING SAME

CROSS-REFERENCE TO RELATED APPLICATIONS

This application claims priority to U.S. Provisional Patent Application No. 62/270,251 filed Dec. 21, 2015, which is incorporated by reference herein in its entirety.

TECHNICAL FIELD

Embodiments of the present disclosure generally relate to polyethylene formulations, and specifically relate to polyethylene formulations comprising partially cross-linked multimodal polyethylene compositions extruded into various shaped articles, such as, for example, pipes.

BACKGROUND

Pipes used to transport mine tailings and slurries are usually made of steel. In some cases, the steel pipes have rubber lining in order to prevent corrosion and improve abrasion resistance, which increases the overall life of the equipment. However, steel pipes are heavy and inflexible, and often are installed at locations with irregular terrain. These factors contribute to the difficulties transporting, installing, and then repairing these pipes.

Pipes manufactured from polyolefins such as HDPE are comparatively lightweight, easier to handle, and non-corrosive. Pipes constructed from HDPE have relatively high rigidity, allowing them to be laid underground, and the pipes still retain some flexibility allowing them to adapt to ground movement. However, the general perception is that polyethylene is not as resistant to abrasion compared to steel, and HDPE pipes may have difficulty transporting gritty water-based slurries, such as mining slurries, petroleum-based slurries and/or solvent-based slurries.

Accordingly, there may be a continual need for polyethylene compositions having good abrasion resistance, as well as good processability.

SUMMARY

Embodiments of the present disclosure are directed to polyethylene formulations comprising partially cross-linked multimodal polyethylene compositions, which provide improved abrasion resistance and improved processability, especially when the polyethylene formulations are extruded into pipe.

In accordance with one embodiment of the polyethylene formulation, the polyethylene formulation comprises a partially cross-linked multimodal polyethylene composition having a the first molecular weight ethylene-based polymer component and a second molecular weight ethylene-based polymer component, wherein the partially cross-linked multimodal polyethylene composition comprises: a density from 0.930 g/cc to 0.943 g/cc measured according to ASTM D792; a melt index ($I_2$) from 0.01 g/10 min to 5 g/10 min, when measured according to ASTM D1238 at 190° C. and a 2.16 kg load; a molecular weight distribution (MWD) from 5 to 10, wherein MWD is defined as $M_w/M_n$ with $M_w$ being a weight average molecular weight and $M_n$ being a number average molecular weight; and a complex viscosity ratio from 250 to 450, wherein the complex viscosity ratio is defined as the complex viscosity at a shear rate of 0.01 rad/s divided by the complex viscosity at a shear rate of at a shear rate of 100 rad/s.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings.

DETAILED DESCRIPTION

Figure 1:
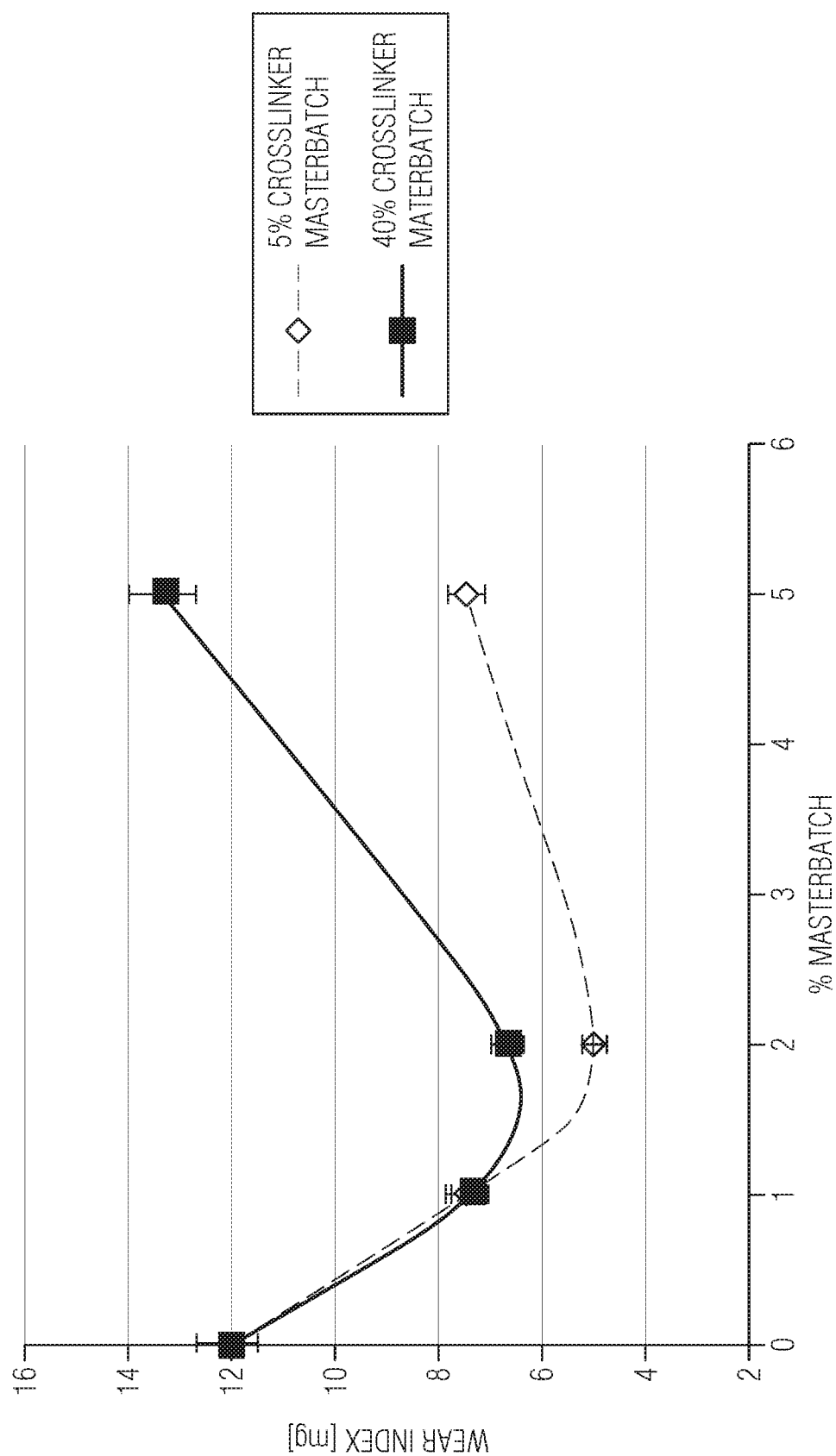
FIG. 1 graphically depicts the wear index of a multimodal polyethylene composition exposed to a peroxide masterbatch including 5% dicumyl peroxide crosslinker versus a multimodal polyethylene composition exposed to a peroxide masterbatch including 40% dicumyl peroxide crosslinker in accordance with one or more embodiments of the present disclosure.

Embodiments of the present disclosure are directed to a polyethylene formulations comprising a partially cross-linked multimodal polyethylene composition having a first molecular weight ethylene-based polymer component and a second molecular weight ethylene-based polymer component, wherein the partially cross-linked multimodal polyethylene composition comprises: a density from 0.930 g/cc to 0.943 g/cc measured according to ASTM D792; a melt index ($I_2$) from 0.01 g/10 min to 5 g/10 min, when measured according to ASTM D1238 at 190° C. and a 2.16 kg load; a molecular weight distribution (MWD) from 5 to 10, wherein MWD is defined as $M_w/M_n$ with $M_w$ being a weight average molecular weight and $M_n$ being a number average molecular weight; and a complex viscosity ratio from 250 to 450. The complex viscosity ratio is defined as the complex viscosity at a shear rate of 0.01 rad/s divided by the complex viscosity at a shear rate of at a shear rate of 100 rad/s.

As used herein and defined further below, "partially cross-linked" means that the partially cross-linked multimodal polyethylene composition remains themoplastically processable after an initiator triggers the crosslinking of the multimodal polyethylene resin. In one or more embodiments as described further below, "partially crosslinked" may correlate to a gel content of 5 wt. % or less as measured according to ASTM D2765 (Method A). Therefore, the partially cross-linked multimodal polyethylene composition may be extruded into pipes that are lightweight, flexible and abrasion resistant. In contrast, with high levels of cross-linking, two things can happen: the polymer is either a thermoset or the polymer has such a high melt temperature that it is difficult to process through extrusion. A thermoset polymer can only have one shape, and after the molding process, it burns upon high temperature exposure. If the polymer has a high melt temperature, for example a melt temperature above 500° F., then any shaping process becomes challenging and requires a high level of energy. Therefore, using a plastic resin with a high degree of cross-linking would fail to produce a desired light weight, abrasion resistant, flexible pipe. In the present embodiments, the level of cross-linking is controlled, so that the polymer is themoplastically processable.

Without being bound by theory, the processability of partially cross-linked multimodal polyethylene composition can be characterized in part by its viscosity at a given shear stress. Viscosity measurements such as complex viscosity at 100 rad/s ($\eta^*_{100}$) for pipe extrusion and/or a melt index can predict the processability. Complex viscosity measured at a frequency of 100 rad/s at a temperature of 190° C. can predict the processability for most pipe extrusion applications. The complex viscosity at 100 rad/s ($\eta^*_{100}$) may correlate with the shear rate imparted on the material during pipe extrusion. A polymer composition with a lower processability viscosity value would be easier to process, or require less energy or amperage to achieve the same throughput (lbs/hour), when compared to a composition with a high processability viscosity value. If a formulation is too viscous, the energy required to achieve a desired throughput rate may be outside of the capability of the extrusion equipment.

In one or more embodiments, the partially cross-linked multimodal polyethylene composition may have a complex viscosity ratio from 250 to 450, or from 325 to 400, or from 340 to 380, wherein the complex viscosity ratio is defined as the complex viscosity at a shear rate of 0.01 rad/s divided by the complex viscosity at a shear rate of at a shear rate of 100 rad/s at a temperature of 190° C. Moreover, the partially cross-linked multimodal polyethylene formulation has a complex viscosity of 500 to 1250 kPa·s at a shear rate of 0.01 rad/s, and a complex viscosity of 2.7 to 4 kPa·s at a shear rate of 100 rad/s. In other embodiments, the partially cross-linked multimodal polyethylene formulation has a complex viscosity of 1000 to 1200 kPa·s at a shear rate of 0.01 rad/s, and a complex viscosity of 3.0 to 3.5 kPa·s at a shear rate of 100 rad/s As will be described further in the Examples below, the inclusion of initiator to facilitate partial crosslinking may achieve a viscosity percent (%) increase from 10% to 40%, or 20% to 30% at 100 rad/s as compared to the multimodal resin without initiator. Similarly, in one or more embodiments, the inclusion of initiator to facilitate partial cross-linking may achieve at least a tenfold, or at least a twelvefold viscosity percent (%) increase at 0.01 rad/s.

As stated above, the partially cross-linked multimodal polyethylene composition may comprise a first molecular weight ethylene-based polymer component and a second molecular weight ethylene-based polymer component. While the multimodal polyethylene resin discussion herein focuses on bimodal polyethylene, the multimodal should not be construed as limited to multimodal resins.

The term "polyethylene formulation" as used herein, means any composition comprising a polyethylene polymer solely, or with additional components, such as an additional polymer or a nucleating agent.

The terms "polyethylene polymer" or "polyethylene resin" as used herein, refer to a polymer made of 100% ethylene-monomer units (a homopolymer) or refers to copolymers (for example, an interpolymer) produced with other monomeric moieties, such as α-olefins (including, but not limited to, propylene, 1-butene, 1-pentene, 1-hexene, 1-octene, and so forth), wherein the copolymer comprises greater than 50% of its units from ethylene. Various polyethylene polymers are contemplated as suitable. For example and not by way of limitation, the polyethylene polymer may comprise HDPE.

The term "multimodal," as used herein, means that the molecular weight distribution (MWD) in a gel permeation chromatography (GPC) curve exhibits two or more component polymers, for example, two or more peaks or wherein one component polymer may even exist as a hump, shoulder, or tail, relative to the MWD of the other component polymers; or in the alternative, wherein two or more components may have only one single peak with no bumps, shoulders, or tails.

In one or more embodiments of the present disclosure, the multimodal HDPE may be a bimodal HDPE. The term "bimodal," as used herein, means that the MWD in a GPC curve exhibits two component polymers wherein one component polymer may even exist as a hump, shoulder or tail relative to the MWD of the other component polymer. A bimodal MWD can be deconvoluted into two primary components: a first molecular weight ethylene-based polymer component and a second molecular weight ethylene-based polymer component. As described further below, the first molecular weight ethylene-based polymer component may have a higher weight-averaged molecular weight according to GPC and a lower density than the second molecular weight ethylene-based polymer component. After deconvolution, the peak width at half maxima (WAHM), the number-average molecular weight (Mn), and weight-average molecular weight (Mw) of each component can be obtained. The first molecular weight ethylene-based polymer component may have a high level of short chain branching, which translates into a lower density, and thus has a greater molecular weight than the first molecular weight ethylene-based polymer component. Without being bound by theory, a resin with a lower density is easier to cross-link without using high amounts of initiator added and/or severe post extrusion processes, because the initiator (e.g., a peroxide initiator) reacts more easily with the small branches that are not sterically hindered.

In embodiments herein, the first molecular weight ethylene-based polymer component may be an ethylene-based interpolymer, ethylene/α-olefin interpolymer, homogeneously branched ethylene-based interpolymer or copolymer, or a heterogeneously branched ethylene-based interpolymer or copolymer. Homogeneously branched interpolymers may be produced, for example, by single-site catalyst systems, and contain a substantially homogeneous distribution of comonomer among the molecules of the interpolymer. Heterogeneously branched interpolymers may typically be produced by Ziegler-Natta type catalysts, and contain a non-homogeneous distribution of comonomer among the molecules of the interpolymer. The comonomer may be an α-olefin. In some embodiments, the first molecular weight ethylene-based polymer component is an ethylene/α-olefin interpolymer, and further an ethylene/α-olefin copolymer. In other embodiments, the first molecular weight ethylene-based polymer component may be an ethylene/1-hexene copolymer. Trace amounts of impurities, for example, catalyst residues, may be incorporated into and/or within a polymer.

As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. As used herein, the term "ethylene-based interpolymer" refers to an interpolymer that comprises, in polymerized form, a majority weight percent ethylene (based on the weight of interpolymer), and one or more additional comonomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers.

Suitable α-olefins may include those containing 3 to 20 carbon atoms ($C_3$-$C_{20}$). In some embodiments, the α-olefin may be a $C_4$-$C_{20}$ α-olefin, a $C_4$-$C_{12}$ α-olefin, a $C_3$-$C_{10}$ α-olefin, a $C_3$-$C_8$ α-olefin, a $C_4$-$C_8$ α-olefin, or a $C_6$-$C_8$ α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, and 1-octene. In further embodiments, α-olefins are selected from the group consisting of 1-hexene and 1-octene. In even further embodiments, the α-olefin is 1-hexene.

Exemplary ethylene/α-olefin interpolymers may include, but are not limited to, ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. In some embodiments, the ethylene/α-olefin interpolymers are selected from the group consisting of EB, EH and EO copolymers. In other embodiments, the ethylene/α-olefin interpolymers are selected from the group consisting of EH and EO copolymers. In further embodiments, the ethylene/α-olefin interpolymer is EH.

In embodiments herein, the second molecular weight ethylene-based polymer component may be an ethylene homopolymer, an ethylene-based interpolymer, ethylene-based copolymer, ethylene/α-olefin interpolymer, or a heterogeneously branched ethylene-based interpolymer or copolymer. The comonomer may be an α-olefin as described herein. In some embodiments, the second molecular weight ethylene-based polymer component is an ethylene-based interpolymer. In other embodiments, the second molecular weight ethylene-based polymer component is ethylene/1-hexene copolymer. In other embodiments, the second molecular weight ethylene-based polymer component is a polyethylene homopolymer. In further embodiments, the second molecular weight ethylene-based polymer component is a mixture of a polyethylene homopolymer and an ethylene/α-olefin interpolymer.

For example, and not by way of limitation, a suitable commercial example of the multimodal resin includes CONTINUUM™ DGDA-2420 NT, a bimodal medium density polyethylene (MDPE) resin available from The Dow Chemical Company (Midland, Mich.).

In one or more embodiments, the partially cross-linked multimodal polyethylene composition may include a density from 0.930 g/cc to 0.943 g/cc measured according to ASTM D792, or from 0.935 g/cc to 0.943 g/cc, or from 0.940 g/cc to 0.943 g/cc, or from 0.940 g/cc to 0.942 g/cc. Within the partially cross-linked multimodal polyethylene composition, the first molecular weight ethylene-based polymer component may have a density lesser than the second molecular weight ethylene-based polymer component. In one or more embodiments, the first molecular weight ethylene-based polymer component may have a density from 0.910 g/cc to 0.930 g/cc, or from 0.920 g/cc to 0.930 g/cc, or from 0.920 g/cc to 0.925 g/cc. In one or more embodiments, the second molecular weight ethylene-based polymer component may have a density from 0.930 g/cc to 0.960 g/cc, or from 0.940 g/cc to 0.960 g/cc, or from 0.950 g/cc to 0.960 g/cc, or from 0.950 g/cc to 0.955 g/cc Moreover, the partially cross-linked multimodal polyethylene composition may include a melt index ($I_2$) from 0.01 g/10 min to 5 g/10 min, when measured according to ASTM D1238 at 190° C. and a 2.16 kg load. In further embodiments, the melt index ($I_2$), which may also be referred herein as the low load melt index, may be from 0.05 g/10 min to 1 g/10 min, or from 0.10 g/10 min to 0.50 g/10 min, or from 0.10 g/10 min to 0.20 g/10 min. Alternatively, the melt index ($I_{21}$) of the partially cross-linked multimodal polyethylene composition may be from about 5 g/10 min to 20 g/10 min, when measured according to ASTM D1238 at 190° C. and a 21.6 kg load. In further embodiments, the melt index ($I_{21}$), which may also be referred herein as the high load melt index, may be from 5 g/10 min to 15 g/10 min, or from 5 g/10 min to 10 g/10 min, or from 8 g/10 min to 10 g/10 min. Within the partially cross-linked multimodal polyethylene composition, the first molecular weight ethylene-based polymer component may have a high load melt index ($I_{21}$) from 10 g/10 min to 30 g/10 min, or from 15 g/10 min to 25 g/10 min, or from 18 g/10 min to 22 g/10 min.

In further embodiments, the partially cross-linked multimodal polyethylene composition may have a molecular weight distribution (MWD) from 5 to 10. As used herein, MWD is defined as the ratio of weight average molecular weight ($M_w$) to number average molecular weight ($M_n$), that is, ($M_w/M_n$). The MWD may be determined by gel permeation chromatography (GPC). In further embodiments, the MWD of the partially cross-linked multimodal polyethylene composition may be from 5 to 8, or from 6 to 8, or from 6.5 to 7.5.

In embodiments herein, the multimodal polyethylene resin can be made by a variety of methods. For example, it may be made by blending or mixing the high molecular component and the low molecular component together. Alternatively, the polyethylene resin may be made in a single reactor or a multiple reactor configuration, where the multiple reactors may be arranged in series or parallel, and where each polymerization takes place in solution, in slurry, or in the gas phase. In some embodiments, a dual reactor configuration is used where the polymer made in the first reactor can be either the first molecular weight ethylene-based polymer component or the second molecular weight ethylene-based polymer component. The polymer made in the second reactor may have a density and melt flow rate such that the overall density and melt flow rate of the polyethylene resin are met. In some embodiments, the first molecular weight ethylene-based polymer component is made in the first reactor, and the second molecular weight ethylene-based polymer component is made in the second reactor. Similar polymerization processes are described in, for example, U.S. Pat. No. 7,714,072, which is incorporated herein by reference in its entirety.

As stated above, an initiator is used to cross-link the multimodal resin to produce a partially cross-linked multimodal polyethylene composition. Various initiator compositions are contemplated, for example, thermal initiators and/or peroxide initiators. In one embodiment, the initiator is a peroxide initiator.

For example, and not by way of limitation, the peroxide initiators may include one or more of the following peroxy compounds such as diacyl peroxides, acetyl alkylsulfonyl peroxides, dialkyl peroxydicarbonates, tert-alkylperoxyesters, OO-tert-alkyl O-alkyl monoperoxycarbonates, di(tert-alkylperoxy)ketals, di(tert-alkyl)peroxides, tert-alkyl hydroperoxides, and ketone peroxides, redox initiators, and the like.

Other possible peroxide initiators may comprise diacylperoxides such as dibenzoyl peroxide BPO, di(2,4-dichlorobenzoyl) peroxide, diacetyl peroxide, dilauroyl peroxide, didecanoyl peroxide, diisononanoyl peroxide and succinic acid peroxide; peroxy esters such as di-tert-butyl diperoxyphthalate, tert-butyl perbenzoate, tert-butyl peracetate, tert-amyl perbenzoate, 2,5-di(benzoylperoxy)-2,5-dimethylliexane, tert-butyl peroxymaleic acid, tert-butyl peroxyisobutyrate, tert-butyl peroxy-2-ethylhexanoate(tert-butyl peroctoate), tert-amyl peroctoate, 2,5-di(2-ethylhexanoylperoxy)-2,5-dimethyl-hexane, tert-butyl peroxypivalate, tert-amyl peroxypivalate, tert-butyl peroxyneodecanoate, tert-amyl peroxyneodecanoate, a-cumyl peroxyneodecanoate; diperoxyketals, such as ethyl-3,3-di(tertobutylperoxy)butyrate, ethyl 3,3-di(tert-amyiperoxy)-butyrate, n-butyl 4,4,-di(tert-butylperoxy)valerate, 2,2-di(tert-butylperoxy)butane, 1,1-di(tert-butylperoxy)cyclohexane, 1,1-di(tert-buty(peroxy)-3,3,5-trimethylcyclo-hexane, and 1,1-di(tert-amylperoxy)cyclohexane; dialkylperoxides, such as 2,5(tert-butylperoxy)-2,5-dimethyl-3-hexyne, di-tert-butyl peroxide, tert-butyl-acumyl peroxide, 2,5-di(tert-butylperoxy)-2,5-dimethylhexane, a-a'-di(tert-butyl-peroxy)-1,3- and 1,4-diisopropylbenzene, and dicumylperoxide; peroxydicarbonates such as di-n-propyl peroxydicarbonate, diisopropyl peroxycarbonate, dicetyl peroxydicarbonate, di-sec-butyl peroxydicarbonate, di(2-ethylhexyl)peroxy dicarbonate, and di(4-ter(-butylcyclohexyl)peroxydicarbonate; and tert-alkylhydro peroxides such as tert-butyl hydroperoxide, tert-amyl hydroperoxide, cumene hydroperoxide, 2,5-dihydroxyperoxy-2,5-dimethylhexane, pinane hydroperoxide, para-menthane hydroperoxide, and diisopropylbenzene hydroperoxide.

Moreover, other possible peroxide initiators may be selected from: 2,5-dimethyl-2,5-di(tert-butylperoxy) hexyne-3; 2,5-dimethyl-2,5-di(tert-butylperoxy)hexane; di-tert-butyl peroxide; 1,3-1,4-di-tert-butylperoxyisopropyl benzene; tert-butylcumylperoxide; dicumylperoxide; 3,3,6,6,9,9-hexamethyl-1,2,4,5-tetracyclononane; 4,4-di-tert-butyl peroxy-n-butylvalerate; 1,1-di-tert-butyl peroxycyclohexane; tert-butyl peroxybenzoate; dibenzoyl peroxide; di(2,4-dichlorobenzoyl)peroxide; di(p-chlorobenzoyl) peroxide; 2,2-di(tert-butylperoxy)butane; ethyl-3,3-bis(tert-butylperoxy) butyrate. In one embodiment, the compositions and resins according to the present disclosure are treated with 2,5-dimethyl-2,5-di(tert-butylperoxy)hexane and bis (tert-butylperoxyisopropyl)benzene. In a specific embodiment, the peroxide initiator may comprise dicumyl peroxide Various methods for delivering the peroxide initiator are contemplated herein. In one embodiment, the peroxide initiator is delivered through a peroxide masterbatch. The peroxide masterbatch may include the peroxide initiator and at least one polyethylene polymer which is compatible with the multimodal polyethylene resin. In one such embodiment, the compatible polymer may be a linear low density polyethylene (LLDPE) copolymer. The amount of peroxide in the masterbatch can vary from 1% by weight to 10% by weight, or from 1% to 5% by weight, or from 1 to 3% by weight. As will be shown in the Examples below, using higher amounts of peroxide initiator may produce too much crosslinking. As stated above, crosslinking beyond the "partial crosslinking" level is undesirable, because it may prevent the resin from being theremoplastically processable. In another embodiment, the peroxide masterbatch may comprise 1% to 5% by weight peroxide initiator, and 95% to 99% by weight polyethylene resin, for example, LLDPE.

In embodiments herein, the compositions may contain one or more processing aids, especially additives beneficial to pipe applications. Additives include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof.

In some embodiments, the processing aid may comprise one or more fluoropolymers. Without being bound by theory, it is believed that the inclusion of one or more fluoropolymers in the compositions described herein improves processability of the composition, by lowering the apparent melt viscosity of the composition to reduce buildup at an extrusion die. Additionally, the inclusion of one or more fluoropolymers in the compositions described herein does not adversely affect the mechanical properties of the compositions. Suitable fluoropolymers may include, but are not limited to, vinylidene fluoride, hexafluoropropylene, chlorotrifluoroethylene, tetrafluoroethylene, perfluoroalkyl perfluorovinyl ethers, 1-hydropentafluoropropylene, 2-hydropentafluoropropylene, and combinations thereof. Other examples of suitable fluoropolymers may include, but are not limited to, copolymers of vinylidene fluoride and one or more comonomers selected from hexafluoropropylene, chlorotrifluoroethylene, 1-hydropentafluoropropylene, and 2-hydropentafluoropropylene. Further examples of suitable fluoropolymers may include, but are not limited to, copolymers of tetrafluoroethylene and one or more comonomers selected from hexafluoropropylene and vinylidene fluoride. In some examples, the fluoropolymers may further be blended with olefins, such as, for example, propylene, or a polyether, such as for example, polyethylene oxide. In some embodiments, the fluoropolymer is selected from the group consisting of vinylidene fluoride/hexafluoropropylene, vinylidene fluoride/hexafluoropropylene/tetrafluoroethylene, tetrafluoroethylene, tetrafluoroethylene/propylene, tetrafluoroethylene/propylene/vinylidene fluoride, or vinylidene fluoride/hexafluoropropylene/polyethylene oxide. In other embodiments, the fluoropolymer is selected from the group consisting of vinylidene fluoride/hexafluoropropylene, vinylidene fluoride/hexafluoropropylene/tetrafluoroethylene, tetrafluoroethylene/propylene/vinylidene fluoride, or vinylidene fluoride/hexafluoropropylene/polyethylene oxide. In further embodiments, the fluoropolymer is vinylidene fluoride/hexafluoropropylene/tetrafluoroethylene.

The fluoropolymer, specifically, the fluoroelastomer described herein, may also be characterized by one or more properties. In some embodiments, the fluoroelastomers employed in the compositions described herein may have a melting point of 100 to 135° C., as measured by the differential scanning calorimetry (DSC) according to ASTM D4591-07. In some embodiments, the fluoropolymers employed in the compositions described herein may have a density of 1.80 to 2.20 g/cc. In some embodiments, the fluoropolymers employed in the compositions described herein may have a melt flow index ($I_5$) of 2.0 to 20.0 g/10 min. The melt flow index ($I_5$) may be determined according to ASTM D1238 at 265° C. with a 5.0 kg load. The one or more fluoropolymers may be employed in the compositions such that the total fluoropolymer level is from 0.001 to 1 weight %, or from 50 to 5000 ppm, or from 100 to 3000 ppm, or from 150 to 2000 ppm, or from 250 to 1000 ppm. In addition to the above described properties, it is believed that incorporation of one or more fluoropolymers (e.g., fluoroelastomers) into the compositions described herein can contribute to better abrasion resistant properties by reducing the coefficient of friction at the surface of the compositions described herein. Additionally, the fluoroelastomer may act as a modifier in the reactive process, thereby limiting the degree of cross-linking. Additional additives, such as hydrotalcite, zinc oxide or other acid scavengers, which maintain the stabilization due to the effects of the reactive extrusion and the peroxide composition products, might further limit or control the degree of cross-linking. In many embodiments, these additives such as the fluoroelastomer and the acid scavenger may be present in the multimodal resin prior to blending with the peroxide masterbatch. In one or more embodiments, the acid scavenger may be present in the peroxide masterbatch, the multimodal resin, or both. In one or more embodiment, the acid scavenger may be present in an amount from 0.001 wt % to 1.0 wt %.

In addition to the complex viscosity described above, various additional performance metrics and properties may describe the partially cross-linked multimodal polyethylene composition. For example, the oxidation induction temperature is a standardized test performed in a differential scanning calorimetry (DSC), which measures the level of thermal stabilization of the material tested. The measurement illustrates the time between melting and the onset of decomposition in isothermal conditions. In one or more embodiments, the partially cross-linked multimodal polyethylene composition has an oxidation induction temperature of at least 240° C. according to ASTM D-3350. According to ASTM D-3350, the oxidation temperature of polyethylene used in pipe applications should be over 220° C.

Moreover, articles made from the present polyethylene formulations may have a wear index less than 40, or less than 30 when subjecting the article to an H-22 abrasion wheel for 500 cycles according at ASTM G195. Further, the articles made from the present polyethylene formulations described herein may have a Shore D Hardness of at least 50, when subjected to a C-17 abrasion wheel for 1000 cycles according at ASTM G195, and using this same standard, some articles may have a Shore D Hardness greater than 60.

In additional embodiments, the degree of crosslinking in the partially cross-linked multimodal polyethylene composition may be quantified in part by the level of gel content. Here, the polyethylene formulation was designed to have a low gel content consistent with a small amount of cross-linking. As illustrated further in the examples below, the articles may, in one or more embodiments, have a gel content of less than 5 wt. % as measured according to ASTM D2765 (Method A), or less than 3 wt. %, or less than 1 wt. %, or less than 0.1 wt. %.

As stated above, the polyethylene formulations are known to be used in the production of pipes and fittings, specifically, pipes suitable to transport slurries or other media that are abrasive or cause a high degree of wear during a relatively short period of time. The pipes can include monolayer pipes, as well as multilayer pipes, including multilayer composite pipes.

In addition to pipes, the polyethylene formulation is contemplated as suitable to other applications in which low shear melt strength would be beneficial. For example, the polyethylene formulations described herein can be used to manufacture various shaped articled, or one or more components of a shaped article. Such articles may be single-layer or multi-layer articles, which may be obtained by suitable known conversion techniques, applying heat, pressure, or a combination thereof, to obtain the desired article. Examples of suitable conversion techniques may include, but are not limited to: blow-molding, co-extrusion blow-molding, injection molding, injection stretch blow molding, compression molding, extrusion, pultrusion, calendaring and thermoforming. Shaped articles may include, for example, pipes, pipe coatings (for example, steel pipe coatings), blow molded articles, injection molded articles, compression molded articles, drip tapes and tubings, geomembranes, films, sheets, fibers, profiles and moldings. The possible types of extrusion are gravimetric extrusion, single or twin screw extrusion and/or extrusion line.

The articles may be produced by extruding the multimodal polyethylene resin and peroxide masterbatch in a common extrusion process, wherein the resin is used in pellet form and no high pressure, energy or post-extrusion curing is needed. The level of cross-linking achieved is small, but well proportioned for the desired effect. Unlike some conventional processes, the articles made in accordance with the present embodiment do not require the polyethylene to be in flake form, which requires high pressure. Moreover, the present formulations eliminate the need for a post-extrusion molten salt bath at 2,500-2,800° C. and also eliminate the need for high amounts of peroxide. For example, there is no requirement to soak the pipes with liquid peroxide at high temperatures and pressures.

Measurement Standards
GPC Testing Standards
Conventional GPC

A PolymerChar (Valencia, Spain) high temperature Gel Permeation Chromatography system consisting of an Infrared concentration/composition detector (IR-5) was used for MW/MWD and comonomer content determination. The carrier solvent was 1,2,4-trichlorobenzene (TCB). The solvent delivery pump, the on-line solvent degasser, autosampler, and column oven were from Agilent. The auto-sampler and detector compartments were operated at 160° C., and the column compartment was operated at 150° C. The columns were three PLgel Mixed-B 10 micron columns. The chromatographic solvent and the sample preparation solvent contained 250 ppm of butylated hydroxytoluene (BHT) and both solvent sources were nitrogen sparged. Polyethylene samples were semi-automatically prepared at targeted concentrations of 2 mg/mL by weighing samples by a computer controlled balance, and delivering calculated amount of solvent by the auto-sampler needle. Samples were dissolved at 160° C. for 3 hour with gentle agitation. The injection volume was 200 μl, and the flow rate was 1.0 mL/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation:

$$M_{pe}=A(M_{ps})^B \qquad \text{Equation (1)}$$

Here, B has a value of 1.0, and the experimentally determined value of A is 0.4316.

A third order polynomial was used to fit the respective polyethylene-equivalent calibration points obtained from Equation (1) to their observed elution volumes for each polystyrene standard. Number average, and weight average molecular weights were calculated according to the following equations:

$$Mn = \frac{\Sigma^i Wf_i}{E^i[Wf_i/M_i]} \quad \text{Equation (2)}$$

$$Mw = \frac{\Sigma^i (Wf_i * M_i)}{\Sigma^i Wf_i} \quad \text{Equation (3)}$$

Where, $Wf_i$ is the weight fraction of the i-th elution component and $M_i$ is the molecular weight of the i-th elution component. The MWD was expressed as the ratio of the weight average molecular weight (Mw) to the number average molecular weight (Mn).

EXAMPLES

The following examples illustrate one or more additional features of the present disclosure described above.

Resins

Table 1 below includes an example resin in accordance with the present disclosure and comparative resins used in the plastic pipe market.

disclosure were compared to a virgin pipe which has the same multimodal resin as Compounded Pipes 1 and 2, yet has not been crosslinked in the presence of a peroxide initiator. Specifically, all pipe examples include the Example 1 resin from Table 1—CONTINUUM DGDA-2420 NT, which also includes 0.025 wt. % of fluoroelastomer. Compound Pipes 1 and 2 both comprise a partially cross-linked multimodal polyethylene composition produced from the Example 1 resin and a peroxide masterbatch comprising LLDPE and 5 wt. % dicumyl peroxide initiator. The mixture included 98 wt. % and 2 wt. % of the peroxide masterbatch (wherein the masterbatch has 5 wt. % dicumyl peroxide initiator). Compound Pipe 1 was produced by extruding the partially cross-linked multimodal polyethylene composition at a 460° F. temperature and Compound Pipe 2 was produced by extruding the partially cross-linked multimodal polyethylene composition at a 480° F. temperature. The non-cross-linked multimodal polyethylene composition was extruded into the Virgin Pipe at a 400° F. temperature.

For the extrusion process, an American Maplan commercial 60 mm groove-feed extruder with a 1 inch IPS (iron pipe size), two 20 feet long vacuum tanks and one 20 feet long spray cooling tank was used. For the fabrication of Compounded Pipes 1 and 2, a manual dry blend of the resin and masterbatch pellets was made and then fed into the extruder.

TABLE 1

| Resin | Resin Supplier | Mw/Mn | Density | Average Stress at Break (Pa) | Average Weight Loss (g) under Taber Abrasion Testing (ASTM G195) | Average Weight Loss (g) under Slurry Abrasion Testing (ASTM G75) |
|---|---|---|---|---|---|---|
| Example 1 - CONTINUUM DGDA-2420 NT | The Dow Chemical Company (Midland, MI) | 6.97 | 0.9415 | 31355415 | 0.0076 | 0.1285 |
| Comparative Example 1 - Yuhwa (KPIC) P600 BK | Korea Petrochemical Ind. Co., Ltd. | 19.75 | 0.9593 | 17052245 | 0.0182 | 0.1975 |
| Comparative Example 2 - CONTINUUM DGDA-2492 | The Dow Chemical Company (Midland, MI) | 19.70 | 0.9504 | 20234080 | 0.0243 | 0.226 |
| Comparative Example 3 - EL-Lene H1000 PC | SCG Chemicals Co., Ltd (Thailand) | 18.33 | Not measured | Not measured | Not measured | 0.19 |
| Comparative Example 4 - DOW ™ HDPE 7808 | The Dow Chemical Company (Midland, MI) | 18.32 | 0.946 | 16286313 | 0.0133 | 0.18 |
| Comparative Example 5 - CONTINUUM DGDA-2492 BK | The Dow Chemical Company (Midland, MI) | 15.68 | 0.9602 | 17819187 | 0.0165 | 0.2145 |
| Comparative Example 6 - DOW ™ MDPE 8818 | The Dow Chemical Company (Midland, MI) | 15.38 | 0.9411 | 13572233 | 0.0182 | 0.203 |

As shown in Table 1, Example 1 (Continuum DGDA-2420 NT) has a narrower MWD than the other resins, which is a property that contributes in part to its superior properties, for example, superior abrasion resistance. Further as shown in Table 1, the Example 1 resin has superior average stress at break, and a lower average weight loss when using either Taber Abrasion testing or Slurry Abrasion testing.

Viscosity Analysis

Referring to Table 2 below, two pipe examples (Compounded Pipes 1 and 2) in accordance with the present The line started up with DGDA-2420 NT resin according to typical process conditions (75 RPM, 400° F. flat profile, 290 lb/h output). Once lined out, and when the melt temperature reached the 400° F. set point, the mixture of Example 1 resin and peroxide masterbatch were fed into the extruder. When the conditions reached steady state, process information was recorded and the temperature profile was increased to 460° F. for Compound Pipe 1, or to 480° F. for Compound Pipe 2.

TABLE 2

|  | Compound Pipe 1 @ 460° F. | Compound Pipe 2 @ 480° F. | Virgin Pipe @ 400 ° F. |
|---|---|---|---|
| Viscosity [KPa-s] @ 190° C. at 0.01 Rad/s shear rate | 1,090 | 1,180 | 84.59 |
| Viscosity [KPa-s] @ 190° C. at 100 Rad/s shear rate | 3.035 | 3.164 | 2.471 |
| Viscosity ratio (0.01 rad/s/100 rad/s) | 359.10 | 371.79 | 34.23 |
| % Change in Viscosity at 0.01 rad/s shear rate | 1188% | 1291% | N/A |
| % Change in Viscosity at 100 rad/s shear rate | 22.8% | 28.1% | N/A |

As shown in Table 2, there is at least a tenfold viscosity increase at a 0.01 rad/s shear rate for Compounded Pipes 1 and 2 versus the Virgin Pipe. Moreover, while not to the same degree, there is also a viscosity increase at a 100 rad/s shear rate for Compounded Pipes 1 and 2 versus the Virgin Pipe.

Analysis of Masterbatches

Referring to FIG. 1, the effects when using peroxide masterbatches having different peroxide initiator amounts was studied. Specifically, the Example 1 resin from Table 1 was crosslinked by a peroxide masterbatch with LLDPE and 5 weight % dicumyl peroxide (PCL-5 peroxide masterbatch supplied by Polyvel Inc) and a peroxide masterbatch with LLDPE and 40 weight % dicumyl peroxide (S-1705 peroxide masterbatch also supplied by Polyvel Inc). As shown, the 5% masterbatch achieved a lower wear index according to ASTM G195 versus the 40% masterbatch. This is due in part to the fact that higher peroxide content makes the cross-linking reaction harder to control.

Abrasion Analysis of Partially Crosslinked Multimodal Polyethylene Pipe

Figure 2:
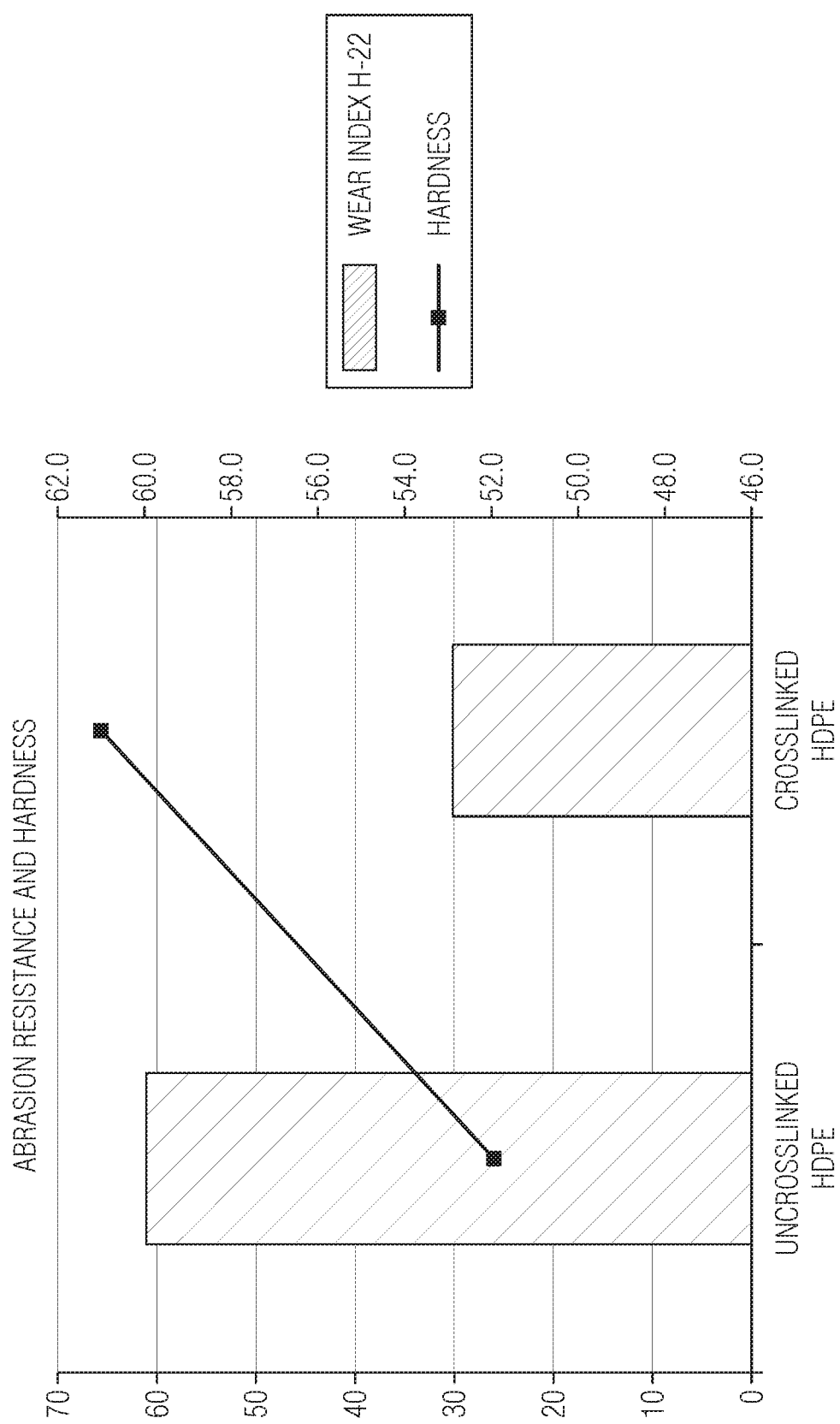
FIG. 2 graphically depicts the hardness for uncrosslinked multimodal polyethylene composition in comparison to a partially crosslinked multimodal polyethylene composition in accordance with one or more embodiments of the present disclosure FIG. 3 graphically depicts the gel content in pipes comprising partially crosslinked multimodal polyethylene composition after extrusion at 460° F. (238° C.) and 480° F. (249° C.), respectively.

For the abrasion testing, 2 test plaques were prepared using a single screw extruder (4140 steel screw, ¾" diameter, 25 peaks, L/D 25, 120" angle) with a flat temperature profile at 145° C. Specifically, one test plaque included the Example 1 resin of Table 1 crosslinked by the PCL-5 peroxide masterbatch, and the other test plaque included the Example 1 resin but was not crosslinked by peroxide initiator. For the crosslinked plaque, the peroxide masterbatch was incorporated into the matrix of the Example 1 resin, at which point, the resulting product was pelletized. The resulting pellets were compression molded in form of plaques at 190° C. in order to perform the abrasion tests according to ASTM G195. From FIG. 2, it can be seen that the addition of the PCL-5 masterbatch improves the H-22 Wear Index by 58% using an H-22 (500 cycles) abrasive wheel according to ASTM G 195. Further as shown, the addition of the PCL-5 masterbatch essentially doubles the Shore D Hardness when subjecting the plaques to an C-17 abrasion wheel for 1000 cycles according at ASTM G195.

Degree of Cross-Linking Analysis

To measure the degree of crosslinking in the partially cross-linked multimodal polyethylene composition, gel measurement tests were performed on Compounded Pipes 1 and 2 as listed in Table 2 above. The method used to determine the degree of cross-linking of the resulting pipe was based on Procedure "A" of ASTM D 2765 standard, where a portion of cross-linked material—in this case pipe—is placed in a fine wire mesh pouch and placed into a flask of boiling xylene for 12 hours. Weights are recorded before and after the process to determine the cross-linked fraction.

Figure 3:
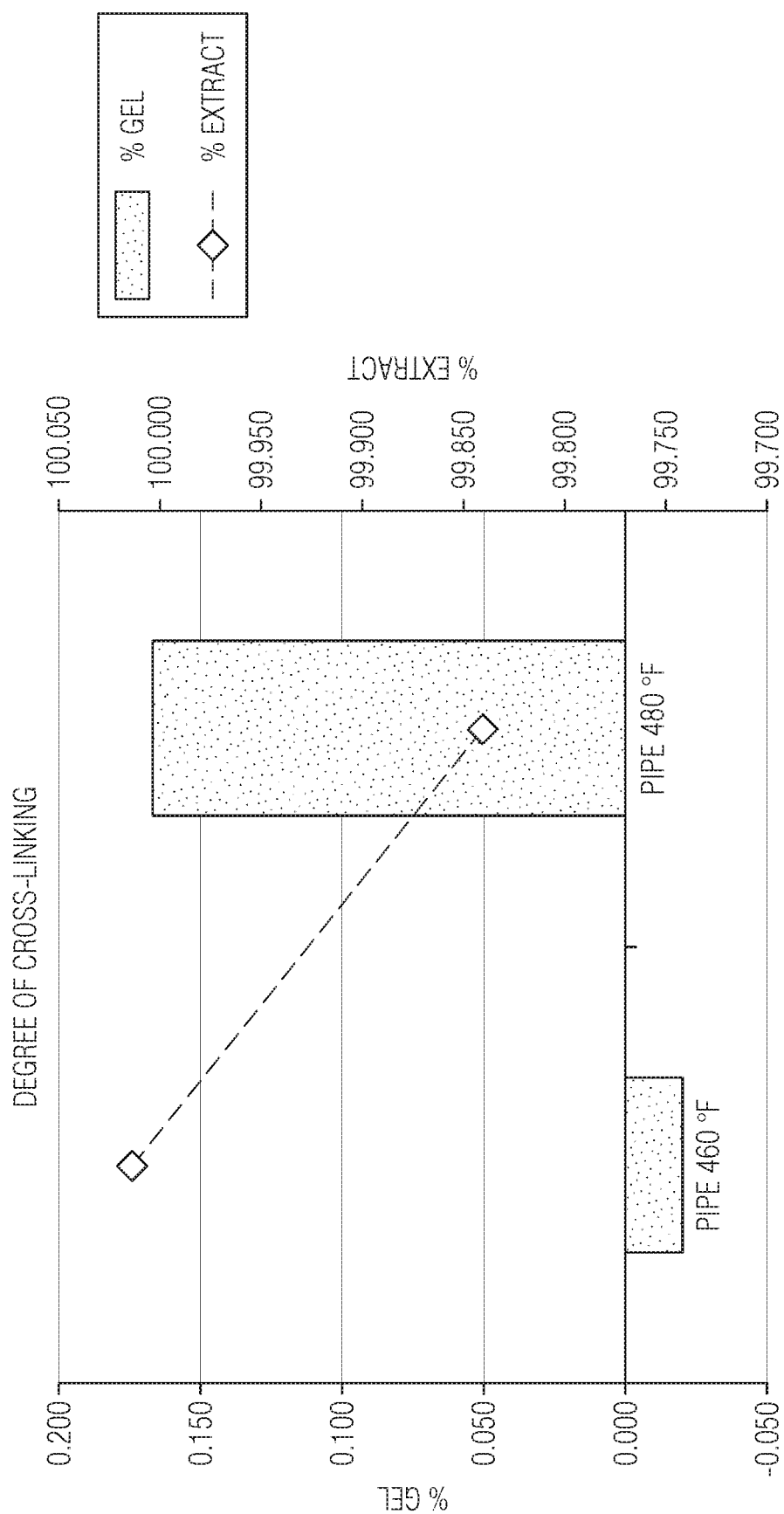

Samples of Compound Pipes 1 and 2 were submitted for this test in duplicate; average values of both samples are shown in FIG. 3. After 12 hrs placed on boiling xylene, it was possible to dissolve most of the samples, with only a very small fraction remaining for Compound Pipe 2, which was extruded at 480° F. This small fraction accounted for less than 2% of gel content. Pipes extruded at a higher temperature, for example, 480° F. may present a higher level of cross-linking, because higher temperatures favor dicumyl peroxide decomposition which may increase cross-linking.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A polyethylene formulation comprising a partially cross-linked multimodal polyethylene composition having a first molecular weight ethylene-based polymer component and a second molecular weight ethylene-based polymer component, wherein the partially cross-linked multimodal polyethylene composition comprises:
   a density from 0.930 g/cc to 0.943 g/cc measured according to ASTM D792;
   a melt index ($I_2$) from 0.01 g/10 min to 5 g/10 min, when measured according to ASTM D1238 at 190° C. and a 2.16 kg load;
   a molecular weight distribution (MWD) from 5 to 10, wherein MWD is defined as $M_w/M_n$ with $M_w$ being a weight average molecular weight and $M_n$ being a number average molecular weight; and
   a complex viscosity ratio from 250 to 450, wherein the complex viscosity ratio is defined as the complex viscosity at a shear rate of 0.01 rad/s divided by the complex viscosity at a shear rate of at a shear rate of 100 rad/s.

2. The polyethylene formulation of claim 1, wherein the partially cross-linked multimodal polyethylene composition has an oxidation induction temperature of at least 240° C. according to ASTM D-3350.

3. The polyethylene formulation according to claim 1, wherein the partially cross-linked multimodal polyethylene composition has a melt index ($I_{21}$) from 5 g/10 min to 20 g/10 min, when measured according to ASTM D1238 at 190° C. and a 21.6 kg load.

4. The polyethylene formulation according to claim 1, wherein the first molecular weight ethylene-based polymer component has a density from 0.910 g/cc to 0.930 g/cc and a melt index ($I_{21}$) from 10 g/10 min to 30 g/10 min when measured according to ASTM D1238 at 190° C. and a 21.6 kg load, and wherein the second molecular weight ethylene-based polymer component has a density from 0.940 g/cc to 0.960 g/cc.

5. The polyethylene formulation according to claim 1, wherein the partially cross-linked multimodal polyethylene formulation has a complex viscosity of 500 to 1250 kPa·s at a shear rate of 0.01 rad/s, and a complex viscosity of 2.7 to 4 kPa·s at a shear rate of 100 rad/s.

6. The polyethylene formulation according to claim 1, further comprising from 0.01 to 1 weight % of fluoroelastomer.

7. The article produced from the polyethylene formulation of claim 1.

8. The article of claim 7, wherein the article has a wear index less than 40, when subjecting the article to an H-22 abrasion wheel for 500 cycles according at ASTM G195.

9. The article of claim 8, wherein the article has a Shore D Hardness of at least 50, when subjected to an C-17 abrasion wheel for 1000 cycles according at ASTM G195.

10. The article according to claim 7, wherein the partially cross-linked multimodal polyethylene formulation has a gel content of less than 5% as measured according to ASTM D2765 (Method A).

11. The article of claim 7, wherein the article is an extruded pipe.

12. A method for making the polyethylene formulation of claim 1 comprising combining a multimodal polyethylene resin with a peroxide masterbatch, wherein the peroxide masterbatch comprises polyethylene and 0.1 to 5 weight % of peroxide initiator.

13. The method of claim 12, wherein the multimodal polyethylene resin, the peroxide masterbatch, or both comprises at least one acid scavenger composition.

14. The method of claim 12, wherein the peroxide masterbatch comprises 1 to 3 weight % of the peroxide initiator.

15. The method of claim 12, wherein the multimodal polyethylene resin further comprises from 0.001 to 1 weight % of fluoroelastomer.

* * * * *